United States Patent
Woodhouse et al.

(10) Patent No.: US 8,976,168 B2
(45) Date of Patent: Mar. 10, 2015

(54) MESH GENERATION FROM DEPTH IMAGES

(75) Inventors: Ben Woodhouse, Guildford (GB); Ben Sugden, Woodinville, WA (US); Tom Salter, Farnham (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

(21) Appl. No.: 13/287,486

(22) Filed: Nov. 2, 2011

(65) Prior Publication Data
US 2013/0106852 A1     May 2, 2013

(51) Int. Cl.
| | | |
|---|---|---|
| G06T 15/00 | (2011.01) | |
| G06T 17/20 | (2006.01) | |
| G06T 17/00 | (2006.01) | |
| G06T 9/00 | (2006.01) | |
| H04N 19/96 | (2014.01) | |

(52) U.S. Cl.
CPC ............ *G06T 17/20* (2013.01); *G06T 17/005* (2013.01); *G06T 9/001* (2013.01); *H04N 19/00969* (2013.01)
USPC ....................................... 345/419

(58) Field of Classification Search
CPC .......... H04N 19/00969; H04N 19/00424; H04N 19/00551; H04N 2213/003; H04N 2213/005; H04N 7/26978; H04N 13/0495; H04N 9/8042; Y10S 707/99942; G06T 17/005; G06T 9/40; G06T 2207/10028; G06T 2207/20016; G06T 17/00; G06T 2207/20141; G06T 2207/20144; G06T 2207/20072; G06F 17/30961; H04L 9/0836; G09G 2340/0407; G09G 2360/122; G06K 9/6219
USPC ................................................. 345/422, 423
See application file for complete search history.

(56) References Cited

U.S. PATENT DOCUMENTS

| | | | |
|---|---|---|---|
| 6,094,453 | A | 7/2000 | Gosselin et al. |
| 6,757,433 | B1 | 6/2004 | Lee |
| 7,529,418 | B2 | 5/2009 | Goss |
| 7,561,156 | B2 | 7/2009 | Levanon et al. |
| 2010/0207941 | A1 | 8/2010 | Lee et al. |
| 2013/0030699 | A1* | 1/2013 | Barnes et al. .................. 701/455 |

OTHER PUBLICATIONS

Bing-Bing, C., Sriram, S., Harpreet S, S., & Paul, H. (n.d). Depth map compression for real-time view-based rendering. Pattern Recognition Letters, 25(Video Computing), 755-766. doi:10.1016/j.patrec.2004.01.002.*

(Continued)

*Primary Examiner* — Kee M Tung
*Assistant Examiner* — Haixia Du
(74) *Attorney, Agent, or Firm* — Miia Sula; Judy Yee; Micky Minhas

(57) ABSTRACT

Systems and methods for mesh generation from depth images are provided. According to one aspect, a method executable by a compression device for sending compressed depth information is provided. The method may comprise, at a compression module executed on the compression device, receiving a depth image of a scene from a depth camera. The depth image may include a matrix of pixels, each pixel in the matrix including a depth value indicating a depth of an object in the scene observed at that pixel. The method may further comprise compressing the depth image into a tree data structure, and sending the tree data structure via a communication path to a rendering device for generating a mesh of the scene at the rendering device.

17 Claims, 7 Drawing Sheets

(56) References Cited

OTHER PUBLICATIONS

Morvan, Y., Farin, D., & de With, P. N. (2005). Novel coding technique for depth images using quadtree decomposition and plane approximation. Proceedings of SPIE, (1), 59603l. doi:10.1117/12.631647.*

Pajarola, R. (2002). Overview of quadtree-based terrain triangulation and visualization. Department of Information & Computer Science, University of California, Irvine.*

C. Dick, J. Schneider, R. Westermann, Efficient Geometry Compression for GPU-based Decoding in Realtime Terrain Rendering, Computer Graphics Forum 28(1):67-83, 2009 [Bibtex].*

Kim et al., Mesh-Based Depth Coding for 3D Video Using Hierarchical Decomposition of Depth Maps, ICIP 2007, pp. 117-120, 2007.*

Farin, et al., "Depth-Image Representation Employing Meshes for Intermediate-View Rendering and Coding", Retrieved at <<http://citeseerx.ist.psu.edu/viewdoc/download?doi=10.1.1.77.9332&rep=rep1&type=pdf>>, 3DTV Conference, May 7-9, 2007, pp. 1-4.

Dick, et al., "Efficient Geometry Compression for GPU-Based Decoding in Realtime Terrain Rendering", Retrieved at <<http://wwwcg.in.tum.de/Research/data/Publications/CGF09.pdf>>, Computer Graphics forum, vol. xx (200y), No. z, Oct. 2009, pp. 1-16.

Pajarola, Renato., "Overview of Quadtree-based Terrain Triangulation and Visualization", Retrieved at http://citeseerx.ist.psu.edu/viewdoc/download?doi=10.1.1.12.4928&rep=rep1&type=pdf>>, UCI-ICS Technical Report No. 02-01, Jan. 2002, pp. 16.

* cited by examiner

MESH GENERATION FROM DEPTH IMAGES

BACKGROUND

Recently, a type of depth camera has been developed for use as a natural input device to a computing device, such as a gaming console. The depth camera captures depth images of one or more users moving within an interaction space. The depth images are processed by the computing device and a wireframe skeleton of each user is generated. As the user moves in the interaction space, real-time skeletal tracking of the user is performed based on a stream of depth images received at the computing device. The skeletal tracking may be used to display an animated figure, such as a player character or avatar, on a display of the computing device, which moves as the user moves in the interaction space.

One drawback of such systems is that they are currently limited to displaying animated figures for which a polygonal mesh has already been stored. Thus, pre-stored player characters, avatars, etc., may be controlled by the natural input methods described above, but an animation of the user himself or other objects in the interaction space cannot be generated based on the depth images. Another challenge with such systems is that image data cannot be exchanged quickly enough over a computer network such as the Internet, to enable remote players using different computing devices to interact with each other via animated figures of suitable quality displayed to each user in real time, in the same virtual space on each of the computing devices.

SUMMARY

Systems and methods for mesh generation from depth images are provided. According to one aspect, a method executable by a compression device for sending compressed depth information is provided. The method may comprise, at a compression module executed on the compression device, receiving a depth image of a scene from a depth camera. The depth image may include a matrix of pixels, each pixel in the matrix including a depth value indicating a depth of an object in the scene observed at that pixel. The method may further comprise compressing the depth image into a tree data structure, and sending the tree data structure via a communication path to a rendering device for generating a mesh of the scene at the rendering device.

According to another aspect, a method executable by a rendering device for generating a mesh is provided, which includes, at a rendering module executed on the rendering device, receiving from a compression device a tree data structure generated from a depth image captured by a depth camera. The depth image includes a matrix of pixels. Each pixel in the matrix includes a depth value indicating a depth of an object in the scene observed at that pixel. The method further comprises generating a mesh from the tree data structure to represent a shape of the objects in the scene, the mesh having a resolution that spatially varies according to a depth of a leaf node in the tree data structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
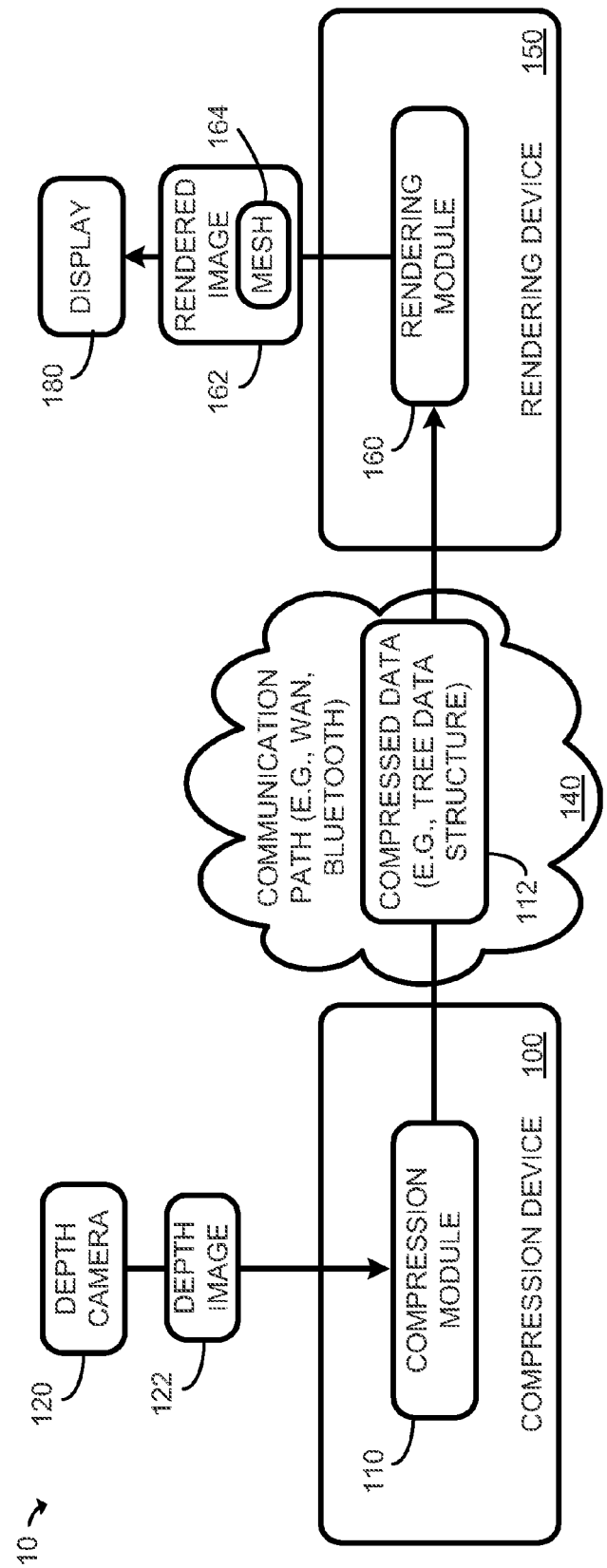
FIG. 1 schematically shows a system for sending and receiving depth information to generate a mesh.

FIG. 1 schematically shows a system 10 for mesh generation from depth images. System 10 may include a compression device 100 and rendering device 150, which may communicate via communication path 140. It will be appreciated that the compression device and rendering device are typically computing devices of the form shown in FIG. 12, which are discussed in detail below. In FIG. 1, the compression device and rendering device are shown as separate, dedicated devices for purposes of illustrating the pipeline for depth image compression, transmission of compressed data, and mesh generation. However, it will be appreciated that in some embodiments discussed below, a computing device may function as both a compression device and a rendering device.

Communication path 140 may be any suitable communication path over a computer network, and may include traversal of a wide area network (WAN) such as the Internet, or local area network (LAN), for example. In other embodiments, the compression device 100 and the rendering device 150 may be two components in a local system of a user, linked by a local communication path, such as a wireless personal access network (e.g. a BLUETOOTH connection) or a wireless local area network (WLAN), or other local communication path.

Compression device 100 may be operatively connected to a depth camera 120. In some embodiments, the compression device and depth camera are separate components, while in other embodiments the compression device and depth camera may be formed in a shared housing. Depth camera 120 is configured to generate depth images that contain depth information indicating depth of objects in a scene. Depth camera 120 may determine, for each pixel, the three dimensional depth of a surface in the scene relative to the depth camera.

Suitable depth camera technologies that may be employed include structured light cameras and time of flight (TOF) cameras, which are explained in more detail below. The output of the depth camera 120 is a depth image, which contains three dimensional depth information for each pixel in the image.

Figure 12:
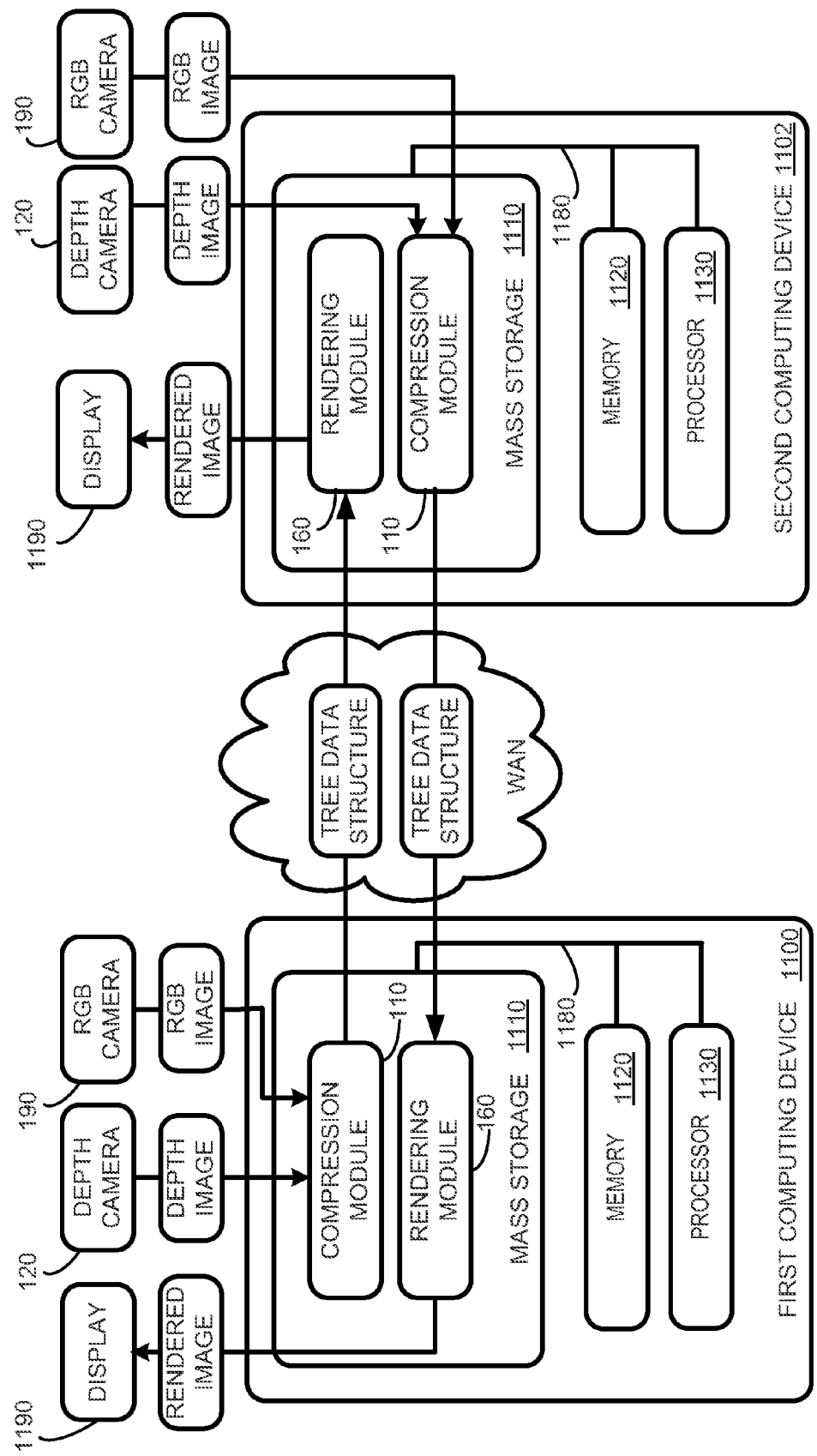
FIG. 12 schematically shows example first and second computing devices for performing the methods of FIG. 2 and FIG. 7, and for natural input interaction in a shared virtual space over a computer network.

Compression device 100 may execute compression module 110. Compression module 110 may be stored in mass storage and executed by a processor of the compression device 100 using portions of memory as illustrated in FIG. 12, described below. Compression module 110 may communicate with depth camera 120, to receive depth images 122 via a wired or wireless connection. In particular, compression module 110 may compress the depth images from depth camera 120 to form compressed data 112 before sending the compressed data over communication path 140. The compressed data 112 may be in the form of a tree data structure, as discussed below. It will be appreciated that the compressed data 112 may be transmitted over the communication path 140 more quickly than uncompressed depth image 122, which is particularly advantageous when sending data over high latency or low bandwidth connections.

The compressed data 112 may be received by rendering device 150. Rendering device 150 may execute a rendering module 160 to generate a mesh 164 of a scene captured by depth camera 120. Particular methods for generating mesh 164 from the compressed data 112 are described in detail below. The rendering module 160 may in turn generate a rendered image 162 including the mesh. Rendering device 150 may be operatively connected to display 180, and configured to output the rendered image 162 including the mesh 164 to the display 180. Display 180 may display the rendered image 162 including the mesh 164 generated by rendering module 160.

Figure 2:
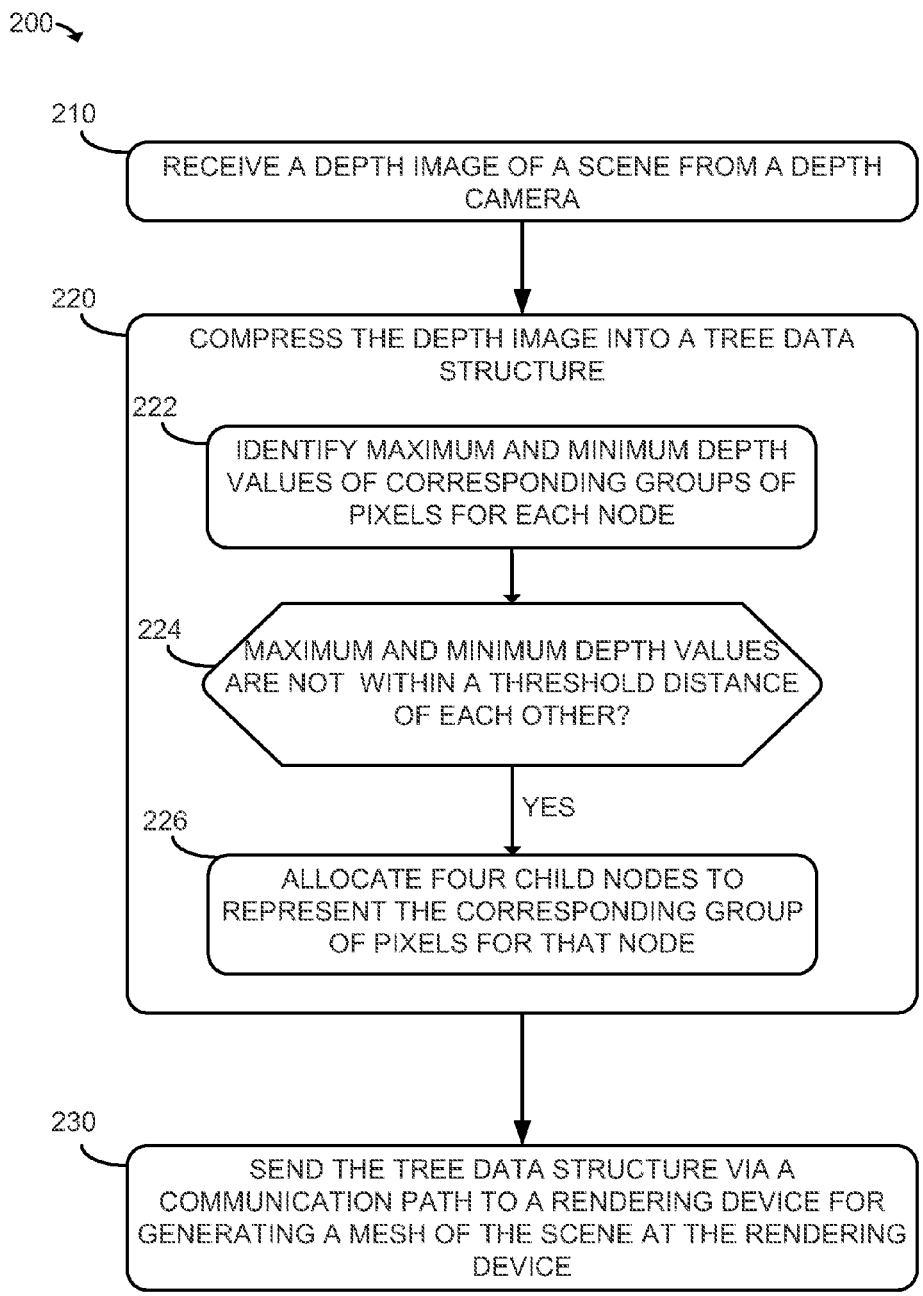
FIG. 2 schematically shows an example method for compressing and sending depth information.

FIG. 2 shows an embodiment of a method 200 for compressing and sending depth information to generate a mesh. Method 200 may be executed by compression module 110 on compression device 100, for example. The method 200 may include, at 210, receiving a depth image of a scene from a depth camera, such as depth camera 120. The depth image may be any suitable data structure, such as a matrix of pixels, where each pixel in the matrix includes a depth value indicating a depth of an object in the scene observed at that pixel.

Figure 3:
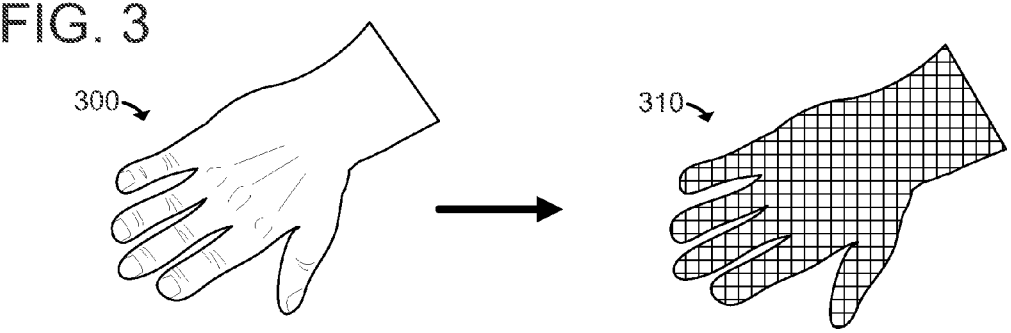
FIG. 3 schematically shows an example depth image.

An example of the depth image received at step 210 is illustrated in FIG. 3, which shows an example depth image 310 schematically illustrated as a pixilated grid of the silhouette of an object 300 in the scene. Example depth image 310 is one example of depth image 162 described above. This illustration is for simplicity of understanding, not technical accuracy. It is to be understood that a depth image generally includes depth information for all pixels, not just pixels that image the object 300.

Turning back to FIG. 2, the method 200 may include, at 220, compressing the depth image into a tree data structure. The tree data structure may be any suitable tree data structure, such as a quadtree data structure. The quadtree data structure may have nodes, where each node has node data representative of a corresponding group of pixels in the depth image. A tree data structures is an acyclic connected graph where each node has zero or more children nodes and at most one parent node. Nodes with no children nodes are termed leaf nodes. The node with no parent node is termed the root node. Nodes with children nodes are termed internal nodes.

Figure 4:
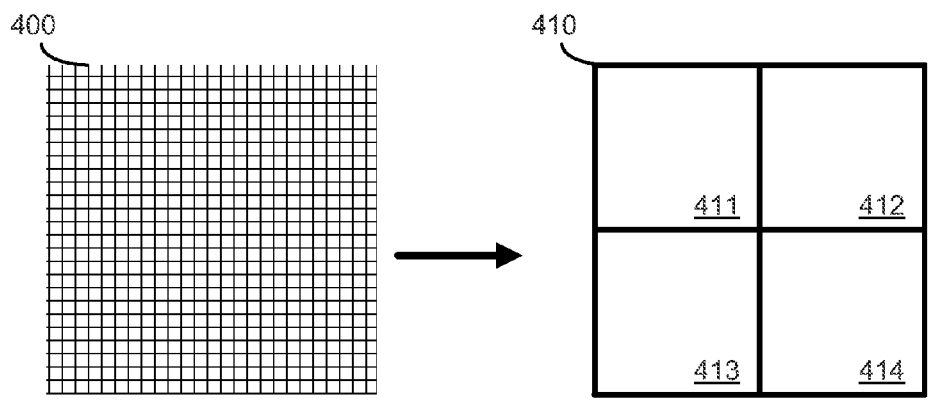
FIG. 4 schematically shows an example tree data structure.

An example of a quadtree data structure is illustrated in FIG. 4, which schematically shows an example quadtree 410, compressed from example depth image 400. Although quadtree 410 is shown with just four nodes 411, 412, 413, and 414, it should be appreciated that a quadtree may have a virtually unlimited number of nodes. Methods for adding nodes to a quadtree based on a depth image will be described in more detail below.

Each node of a quadtree may have node data representative of a corresponding group of pixels in the depth image the quadtree is compressed from. In the example quadtree 410, nodes 411, 412, 413, and 414 each may have node data representative of four quadrants of depth image 400. Node data may include, for each node, an average depth value of the corresponding group of pixels. For example, node 411 of quadtree 410 may include an average of all of the depth values for the pixels in the upper left quadrant of depth image 400. For some nodes, the average depth value may provide a reasonable approximation for the depth of all pixels represented by that node. However, if the pixels in the group of pixels indicate a large variety of depth values, the corresponding node may have child nodes added to more accurately represent the depth image.

Turning back to FIG. 2, as one example of an approach for adding child nodes, method 200 may include, at 222, identifying maximum and maximum and minimum depth values for corresponding groups of pixels for each node. At 224, if the minimum depth value is not within a threshold distance of the maximum depth value, four child nodes may be allocated to represent the corresponding group of pixels for that node at 226. In this way, the method may determine that depth values within a range (i.e., the threshold distance) do not merit adding additional child nodes to the quadtree. The range may be set to meet performance expectations; however, if all pixels associated with the node fall within the range, then any variance in the pixel depth within the range will effectively be lost in this compression step.

Figure 5:
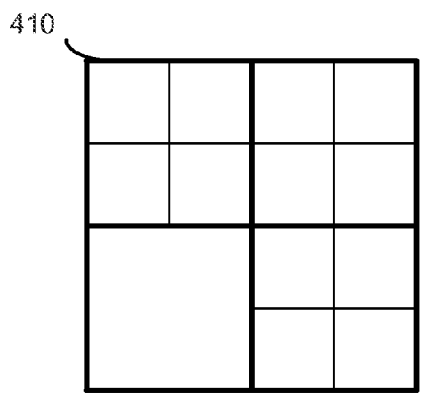
FIG. 5 schematically shows the example tree data structure of FIG. 4 with allocated child nodes.

Turning to FIG. 5, FIG. 5 shows quadtree 410 where nodes 411, 412, and 414 have been allocated child nodes according to method 200. Node 413 does not meet the condition at 224, so child nodes are not allocated for node 413. The process of allocating child nodes may be repeated for all nodes, including newly allocated child nodes, until a suitable termination criteria is met. For example, a suitable termination criteria may be that each leaf node in the quadtree represents a group of pixels in the depth image with a minimum and maximum depth value within a threshold distance of each other, as discussed above. Using such criteria, the quadtree may have a higher resolution (i.e. more leaf nodes) for areas with larger depth gradients. In this way, large flat areas of a scene may be represented using less memory, while still preserving detail for areas of the scene with a more pronounced depth profile.

Figure 6:
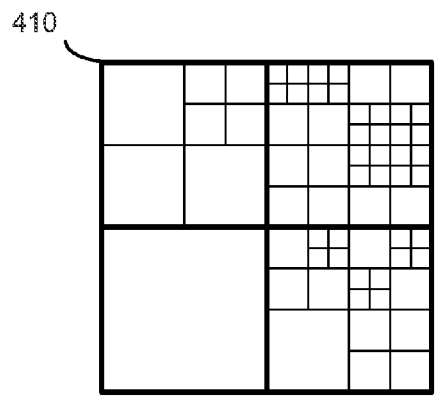
FIG. 6 schematically shows the example tree data structure of FIG. 5 with more allocated child nodes.

Turning to FIG. 6, FIG. 6 shows quadtree 410 after allocating all child nodes as described above. The overall resolution (i.e. depth from a leaf node to the root node, or "root node depth") of quadtree 410 may be adjustable by adjusting parameters associated with a compression scheme. For example, the threshold distance described above may be adjustable to modify a resolution and size of the resulting quadtree, which in turn affects a bandwidth that would be utilized to send the quadtree over the communication path described above. Increasing the threshold distance may cause the overall resolution of the quadtree to decrease because child nodes may not be added as often, due to the less stringent condition. This will result in a lower resolution and smaller size quadtree, which may be sent over a communication path more quickly and using less bandwidth than a higher resolution tree data structure.

Each node in quadtree 410 may include node data in addition to the average depth value. For example, node data may indicate whether that node has associated child nodes. Further, node data may indicate whether the associated group of pixels for that node images background objects. In some embodiments, the average depth value is assigned a value outside of a normal range of a depth camera to signify that the associated group of pixels images background objects. Thus, those background nodes may be treated differently (e.g., ignored) when generating a mesh, so as to generate meshes for objects of interest only.

Turning back to FIG. 2, the method 200 may include, at 230, sending the tree data structure via a communication path to a rendering device for generating a mesh of the scene at the rendering device. The rendering device may be rendering device 150 of FIG. 1, for example. In some embodiments, no raw pixel data is sent to the rendering device.

Figure 7:
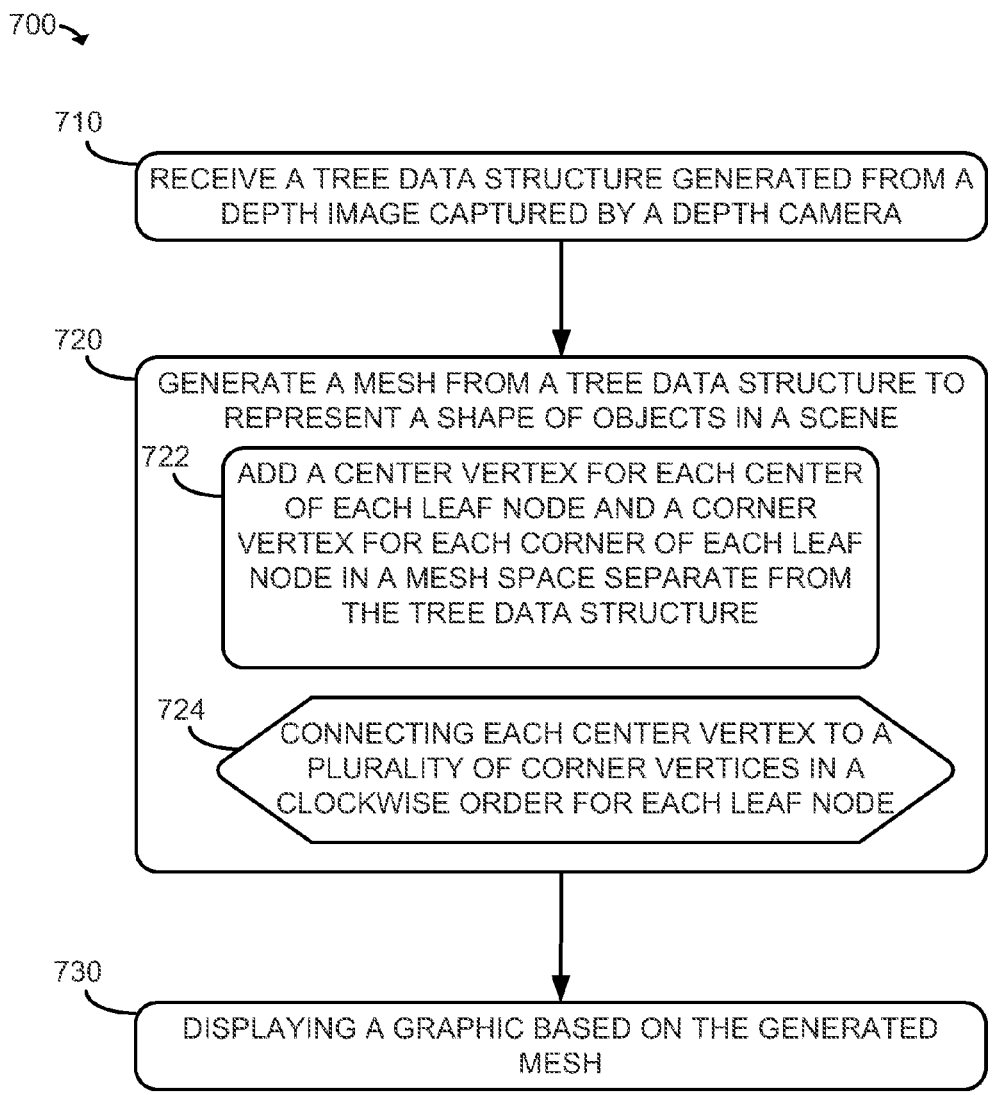
FIG. 7 schematically shows a method for generating a mesh from a tree data structure.

Turning to FIG. 7, FIG. 7 shows a method 700 for receiving a tree data structure and generating a mesh. Method 700 may be performed by rendering module 160 executed on rendering device 150, for example. Method 700 may include, at 710, receiving a tree data structure. The tree data structure may be a quadtree data structure sent from a compression device, as described above.

Method 700 may include, at 720, generating a mesh from the tree data structure to represent a shape of the objects in the scene. In some embodiments, the mesh is generated such that the mesh has a varying resolution. The resolution may vary according to a depth of a corresponding leaf node in the tree data structure. Leaf nodes with a high depth may indicate regions of a scene with edges, or with larger depth gradients. Accordingly, the resolution of the mesh may be higher in such areas. The mesh may be composed of any suitable mesh element, such as a triangle. In other words, the mesh may be a mesh of triangles.

Figure 8:
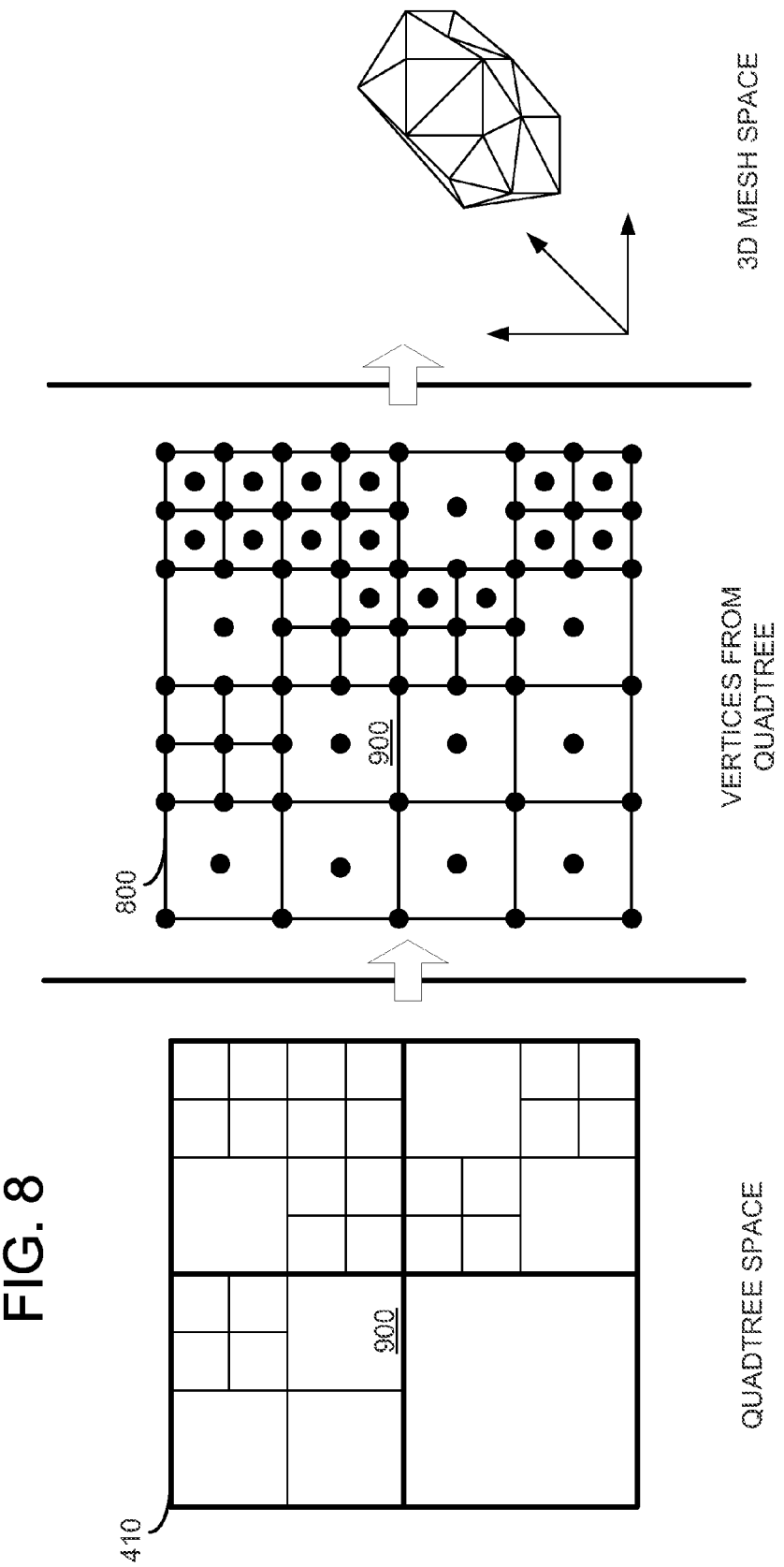
FIG. 8 schematically shows vertices of a mesh.

In some embodiments, a mesh is generated directly from a quadtree, without first converting the quadtree to an image. This may be accomplished as follows. Method 700 may include, at 720, adding a center vertex for each center of each leaf node, and a corner vertex for each corner of each neighboring node of the current leaf node. Such vertices are illustrated in FIG. 8, which shows example quadtree 410 of FIG. 4, and which schematically shows vertices of a mesh 800. In particular, mesh 800 has vertices for every corner and center of leaf nodes (e.g., leaf node 900) of quadtree 410. A vertex's 3D position is determined by the 2D position of the corresponding leaf node corner, and the average depth value of the current leaf node. Vertices of mesh 800 are shown schematically overlaying quadtree 410 for ease of understanding. As shown, mesh 800 is typically generated in three dimensional mesh space, and saved in a distinct data structure that represents the three dimensional position of each node in the mesh, along with the mesh edges that connect the nodes, and the surfaces formed by the edges. An indexing system may be used to map nodes from the quadtree representation to the three dimensional mesh representation.

Figure 9:
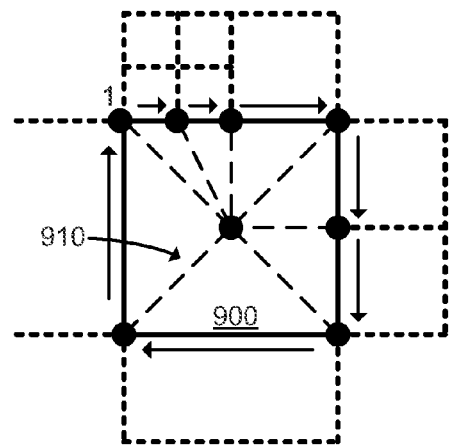
FIG. 9 schematically shows edges of a mesh for an example leaf node.

To generate triangles for the mesh, for each leaf node in the quadtree data structure, the edges of the current leaf node are scanned for neighboring leaf nodes, and a triangle fan is generated connecting the center vertex of the current leaf node to the corner vertices of each of the neighboring leaf nodes, as illustrated in FIG. 9.

Figure 10:
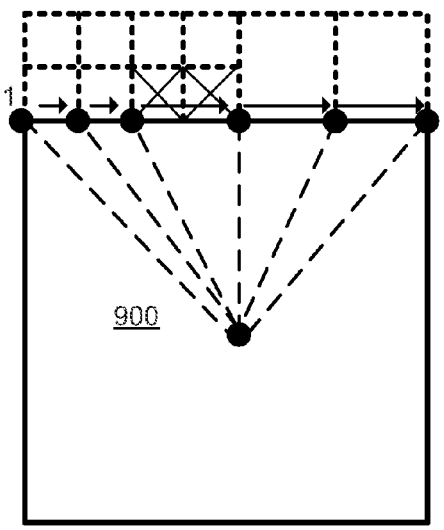
FIG. 10 schematically shows handling of background nodes during mesh generation.

As shown in FIG. 10, in some cases, quadtree nodes that represent background in the scene may be omitted from the mesh during mesh generation. This may be accomplished by, for example, determining that a depth of a neighbor node in the quadtree exceeds a threshold and thus represents a background of the scene, and omitting the vertex of the quadtree from the mesh. In FIG. 10, an "X" is placed in two nodes determined to be background. A triangle is added prior to the background nodes, but no triangle is added for the corner vertex in between the two background nodes. In this manner, background may be omitted during mesh generation.

Other mesh optimization schemes may be utilized to modify a mesh. For example, in some embodiments, 4-triangle fans which can be equally represented by 2-triangle fans are detected, and the 4-triangle fans are converted to equivalent 2-triangle fans. Other equivalences may also be recognized and substitutions made, as appropriate.

In some embodiments, the mesh generated by the methods described herein may omit portions of the scene that are static, or in the background. Thus, mesh is not generated for nodes which represent a corresponding group of pixels imaging a static background object. In this way, processing power may be saved while still accomplishing the benefits of method 700. Node data may indicate that the corresponding groups of pixels image a background object, as described above with respect to method 200, and these background objects, being static, may not be represented in the mesh.

Figure 11:
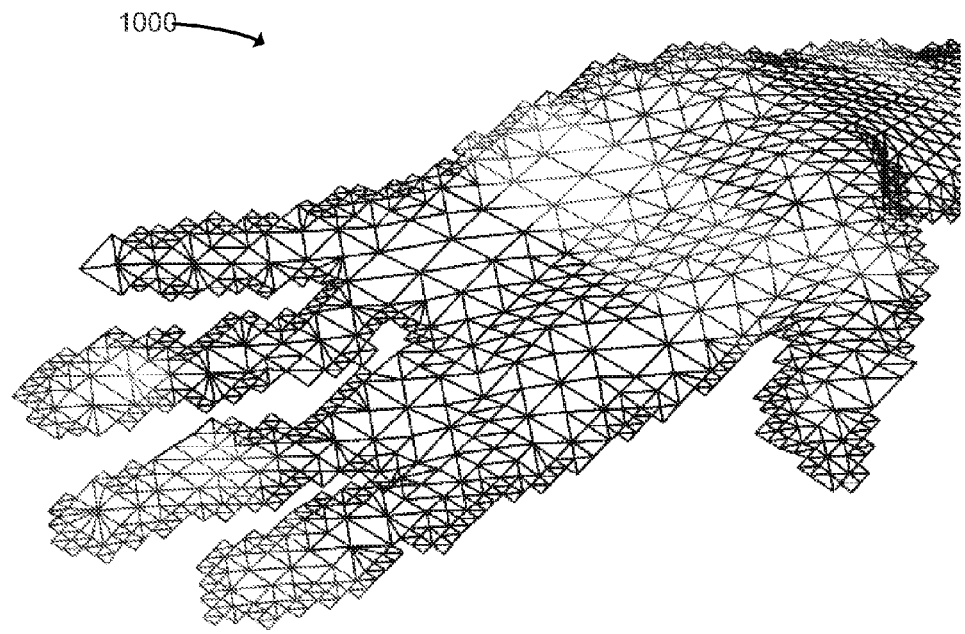
FIG. 11 schematically shows an example mesh.

Turning briefly to FIG. 11, FIG. 11 shows an example mesh 1000 of object 300 of FIG. 3. Mesh 1000 may be created via methods 200 and 700 described above, for example. As shown, mesh 1000 includes a triangle fan for each leaf node in the underlying data structure. Mesh 1000 has a higher resolution for areas of object 300 with a more complex depth profile, and a lower resolution for flatter areas of object 300. In other words, mesh 1000 has a resolution that spatially varies according to a depth of a leaf node in the tree data structure Turning back to FIG. 7, method 700 may include, at 730 displaying a graphic based on the generated mesh. In some embodiments, the graphic is a rendered image including a three dimensional rendering of an object whose shape is represented by the mesh. The graphic may include other aspects not shown via the mesh, such as a color or shading. The graphic may emulate a scene observed by a depth camera, or a combination of a depth and regular 'RGB' camera. The graphic may be displayed via display 180 of FIG. 1, for example.

Although methods 200 and 700 have been described with respect to separate devices, it should be appreciated that a single computing device may execute both the compression module and the rendering module. In this way, the computing device may be able to execute embodiments of both method 200 and method 700. A plurality of such computing devices may be in communication with each other, as shown in FIG. 12.

FIG. 12 schematically shows internal details of a first computing device 1100 and a second computing device 1102 that may perform one or more of the above described methods and processes, such as methods 200 and 700, and further that may communicate with each other over a network to enable two-way communication of compressed tree data structures generated from compressed depth images captured at the source device, which may be used to generate respective meshes at each of the devices.

On each of the first and second computing devices, a depth image is captured by the corresponding depth camera 120, and passed to a compression module, which compresses the depth image to a tree data structure via a compression module 110, as described above. The first computing device 1100 transmits its compressed tree data structure to the rendering module 160 on the second computing device 1102, and vice versa. Thus, the rendering module at each device receives a compressed tree data structure representing a depth image captured at the source device from which it was received, and generates a mesh therefrom, according to the methods described above.

At each of the first and second computing devices, a rendered image or graphic including the corresponding mesh is outputted for display on an associated display. In this manner, users at each of two different physical locations may use natural input through a depth camera interface to control virtual representations, such as animated figures, etc., which interact with each other in the same virtual environment, displayed to each user in each location in real time, even over low bandwidth connections. As but one example, the users may interact in a shared gaming session in which the mesh for the each user's player character is generated using the methods described herein. The possibilities for other forms of virtual interaction using the systems and method described herein abound.

It will be appreciated that the first and second computing devices are shown in simplified form. It is to be understood that virtually any computer architecture may be used without departing from the scope of this disclosure. In different embodiments, computerized devices may take the form of a mainframe computer, server computer, desktop computer, laptop computer, tablet computer, home entertainment computer, network computing device, mobile computing device, mobile communication device, gaming device, etc.

The first and second computing devices may each include mass storage 1110. Mass storage 1110 may have stored thereon compression module 110 and rendering module 160 as described with reference to FIG. 1. Computing device 1110 may also include memory 1120. Compression module 110 and rendering module 160 may be loaded into portions of memory via bus 1180 for execution by processor 1130.

Display 1190 may be used to present a visual representation of data held in mass storage 1110 and/or memory 1120. As the herein described methods and processes change the data held by mass storage 1110 and/or memory 1120, display 1190 may visually represent changes in the underlying data. For example, display 1190 may display a graphic based on a mesh generated at rendering module 160.

Display 1190 may include one or more display devices utilizing virtually any type of technology. Such display devices may be combined with memory 1120, processor 1130 and/or mass storage 1110 in a shared enclosure, or such display devices may be peripheral display devices.

As briefly discussed above, depth camera 120 may be a structured light depth camera configured to project a structured infrared illumination comprising numerous, discrete features (e.g., lines or dots). Depth camera 120 may be configured to image the structured illumination reflected from a scene onto which the structured illumination is projected. Based on the spacings between adjacent features in the various regions of the imaged scene, a depth map of the scene may be constructed.

Alternatively, depth camera 120 may be a time-of-flight camera configured to project a pulsed infrared illumination onto the scene. The depth camera may include two cameras configured to detect the pulsed illumination reflected from the scene. Both cameras may include an electronic shutter synchronized to the pulsed illumination, but the integration times for the cameras may differ, such that a pixel-resolved time-of-flight of the pulsed illumination, from the source to the scene and then to the cameras, is discernable from the relative amounts of light received in corresponding pixels of the two cameras.

In some embodiments, computing device 1100 may include an RGB camera 190. Virtually any type of digital camera technology may be used without departing from the scope of this disclosure. As a nonlimiting example, RGB camera 190 may include a charge coupled device image sensor.

Computer readable storage media may be provided to store and/or transfer data and/or instructions executable to by the processor of the computing device to implement the herein described methods and processes. The computer-readable storage media are physical devices that may take the form of CDs, DVDs, HD-DVDs, Blu-Ray Discs, EEPROMs, and/or floppy disks, among others. Thus, the computing device described above may be provided with appropriate drives or readers to read computer readable storage media of these formats. It will be appreciated that the computer readable storage media are non-volatile storage media and thus instructions may be stored on the computer readable storage media in a non-transitory manner. These instructions may be read from the computer readable storage media and stored on mass storage of the computing device, to be implemented by the processor using portions of memory.

The term "program" or "module" may be used herein to refer to software that performs one or more particular functions when executed by a processor of a computing device. These terms are meant to encompass individual or groups of executable files, data files, libraries, drivers, scripts, and database records, for example. The embodiments described herein show one example organization of such programs and modules. However, it should be appreciated that the functions described herein may be accomplished by differently organized software components.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method executable by a compression device for sending compressed depth information, the method comprising, at a compression module executed on the compression device:
   receiving a depth image of a scene from a depth camera, the depth image including a matrix of pixels, each pixel in the matrix including a depth value indicating a depth of an object in the scene observed at that pixel;
   compressing the depth image into a tree data structure without first generating an initial mesh from the depth image, such that a mesh of the depth image can be generated from the tree data structure, wherein compressing the depth image into the tree data structure comprises:
      instantiating the tree data structure having nodes, each node having node data representing a corresponding group of pixels in the depth image;
      assigning groups of pixels from the matrix of pixels into nodes of the tree data structure;
      identifying maximum and minimum depth values of the corresponding group of pixels for each node in the tree data structure;
      allocating child nodes to represent the corresponding group of pixels for that node if the maximum and minimum depth values are not within a threshold distance of each other; and
   sending the tree data structure via a communication path to a rendering device for generating a mesh of the scene at the rendering device.

2. The method of claim 1, where the tree data structure is a quadtree data structure, each node having node data representative of a corresponding group of pixels in the depth image.

3. The method of claim 2, where the node data for each node includes an average depth value of the corresponding group of pixels.

4. The method of claim 2, where the node data for each node indicates whether that node has associated child nodes.

5. The method of claim 2, where the threshold distance is adjustable to modify a resolution of the quadtree and a bandwidth required to send the quadtree.

6. The method of claim 2, further comprising displaying a graphic based on the mesh of the scene.

7. A method executable by a rendering device for generating a mesh, the method comprising, at a rendering module executed on the rendering device:
    receiving, from a compression device, a tree data structure generated from a depth image captured by a depth camera, the depth image including a matrix of pixels, each pixel in the matrix including a depth value indicating a depth of an object in the scene observed at that pixel, wherein the depth image is compressed into the tree data structure without first constructing a mesh from the depth image and the tree data structure having nodes, each node representing a group of pixels in the depth image; and
    generating a mesh from the tree data structure to represent a shape of the objects in the scene without first converting the tree data structure to an image, the mesh having a resolution that spatially varies according to a depth of a leaf node in the tree data structure, wherein generating the mesh comprises:
    adding a center vertex for each center of each leaf node and a corner vertex for each corner of each leaf node in a mesh space separate from the tree data structure; and
    connecting the center and corner vertices by edges to generate a mesh of triangles.

8. The method of claim 7, where the tree data structure is a quadtree data structure, each node having node data representative of a corresponding group of pixels in the depth image.

9. The method of claim 8, where the node data for each node includes an average depth value of the corresponding group of pixels.

10. The method of claim 8, where the node data for each node indicates whether that node has associated child nodes.

11. The method of claim 8, further comprising displaying a graphic based on the generated mesh.

12. The method of claim 8, where a mesh is not generated for nodes having node data representing a corresponding group of pixels imaging a static background object.

13. The method of claim 8, where the triangle mesh includes a triangle fan for each leaf node.

14. The method of claim 13, where the triangle fan is generated by connecting each center vertex to a plurality of corner vertices in a clockwise order for each leaf node.

15. The method of claim 8, where generating the triangle mesh includes detecting 4-triangle fans which can be equally represented by 2-triangle fans, and converting the 4-triangle fans to equivalent 2-triangle fans.

16. A computerized system for sending and receiving depth information to generate a mesh, the system comprising a first computing device including a processor and memory, the processor being configured to:
    at a compression module of the first computing device, receive a first depth image of a first scene from a first depth camera;
    compress at the first computing device the first depth image into a first quadtree data structure having nodes, each node representing a group of pixels in the first depth image, wherein the first depth image is compressed into the first quadtree data structure without first constructing an initial mesh from the first depth image, such that a first mesh of the first depth image can be generated from the first quadtree data structure, wherein each node of the first quadtree data structure is allocated child nodes to represent the group of pixels if a difference between a maximum and a minimum depth value of the group of pixels is greater than a threshold value;
    send from the first computing device the first quadtree data structure via a communication path to a rendering device of a second computing device for generating the first mesh of the first scene at the rendering device of the second computing device without first converting the first quadtree data structure to an image;
    at a rendering module of the first computing device, receive from a compression device of the second computing device, a second quadtree data structure generated from a second depth image captured by a second depth camera, the second quadtree data structure indicating depth of objects in a second scene; and
    generate a second mesh at the first computing device from the second quadtree data structure to represent a shape of the objects in the second scene, the second mesh having a resolution that varies according to a depth of a leaf node in the second quadtree data structure, wherein generating the mesh includes adding at least one vertex to each leaf node of the tree data structure in a mesh space separate from the tree data structure.

17. The system of claim 16, further comprising displaying a graphic based on the first and second mesh.

* * * * *